United States Patent [19]

Richmond

[11] 4,429,264

[45] Jan. 31, 1984

[54] SYSTEM AND METHOD FOR THE AUTOMATIC CONTROL OF ELECTRICALLY OPERATED GATES

[76] Inventor: Moscow K. Richmond, 2819 Butler Ave., Los Angeles, Calif. 90066

[21] Appl. No.: 266,182

[22] Filed: May 22, 1981

Related U.S. Application Data

[63] Continuation-in-part of Ser. No. 126,717, Mar. 3, 1980.

[51] Int. Cl.³ .............................................. H02P 3/00

[52] U.S. Cl. .................................... 318/466; 318/266

[58] Field of Search ............... 318/265, 266, 466, 467, 318/480; 187/29

[56] References Cited

U.S. PATENT DOCUMENTS 3,781,622 12/1973 Acton et al. ........................ 318/466

4,299,308 11/1981 Shung et al. ...................... 187/29 R 4,338,553 7/1982 Scott, Jr. ......................... 318/466 X

*Primary Examiner*—G. Z. Rubinson

*Assistant Examiner*—W. E. Duncanson, Jr.

*Attorney, Agent, or Firm*—Robert J. Schaap

[57] ABSTRACT

A system and method for the automatic control of electrically operated gates is disclosed which includes a gate position transducer which provides an output signal in the form of pulses representing the incremental motion of the gate. The system also includes electronic circuitry responsive to the output signal of the position transducer for determining when the gate is either fully open or fully closed and also for determining when the gate motion is obstructed. The control system is fully automatic and does not require mechanical adjustments or the use of limit switches. Optional operating modes include an automatic close mode and the simultaneous operation of two gates.

39 Claims, 6 Drawing Figures

SYSTEM AND METHOD FOR THE AUTOMATIC CONTROL OF ELECTRICALLY OPERATED GATES

CROSS-REFERENCE TO RELATED APPLICATION

This is a continuation-in-part of applicant's prior co-pending application Ser. No. 126,717, filed Mar. 3, 1980.

BACKGROUND OF THE INVENTION

This invention relates to a system and method for the automatic control of electrically operated gates and more particularly to a system and method for the automatic control of the opening and closing of gates which is adaptable for use with a wide variety of sizes and types of gates without the need for mechanical adjustments.

Over the years, a variety of types and styles of gates have been developed to provide security for such areas as parking structures and entrances and exits to residential and industrial property. These gates may take the form of sliding gates which move in a track, or swinging gates which are rotatably hinged to a structure. Where large passageways are involved, gates may be provided in pairs which operate from opposite sides of the openings.

Many control systems have been developed to provide automatic control for the opening and closing of gates. These control systems include an electric motor operatively connected to the gate to control its motion. Typically, the motor is controlled by a switch in the vicinity of the gate which can only be operated by authorized personnel. For example, the switch may be in the form of a key switch which can only be operated by use of a conventional key or by a card key. Prior art control systems also employ means for mechanically sensing when the gate is in its fully opened or fully closed position. These sensing means are typically in the form of limit switches which are used to deenergize the motor when the gate has reached its full travel position. The limit switches must be individually adjusted for each gate installation to ensure proper alignment with the opened and closed positions of the gate. In addition, because of the mechanical nature of the limit switches, they tend to wear and change in their adjustment, resulting in improper gate operation.

In addition to detecting the opened and closed positions of the gate, safety considerations require means for detecting if the gate has encountered an obstruction in its travel. For example, such obstructions might be caused by a vehicle or pedestrian in the path of the gate while it is being operated. When an obstruction is detected, gate motion must be stopped to avoid damage to either the gate or the obstruction.

Prior art gate control systems employ several techniques for detecting gate obstruction. One detection technique employs electrical sensors in the form of pressure-actuated electrical switches mounted directly to the gate. When these switches contact an obstruction, they interrupt power to the motor and stop the gate travel. Another detection technique used in prior art gate control systems includes monitoring the electrical current flowing through the motor used to power the gate. When the gate motion is obstructed, the increased load on the motor is reflected by an increase in motor current. This motor current increase is then used as a signal to stop gate travel.

From the above discussion of prior art gate control systems, it can be seen that these systems employ separate and distinct means for sensing the end of travel of the gate, and for sensing gate obstruction. Further, the means for sensing the end of travel of the gate requires individual mechanical adjustments for each gate installation.

It is accordingly an object of the present invention to provide a new and improved system and method for the automatic control of electrically operated gates;

It is another object of the present invention to provide a system and method for the automatic control of gate opening and closing which combines the means for sensing end of travel of the gate with the means for detecting gate obstruction;

It is yet another object of the present invention to provide a new and improved system and method for the automatic control of gate opening and closing which employs means for sensing gate end of travel which is automatically self-adjusting;

It is still another object of the present invention to provide a system and method for the automatic control of gate opening and closing which is adaptable for use with either one or a pair of sliding or swinging gates.

SUMMARY OF THE INVENTION

Briefly stated and in accordance with the presently preferred embodiment of the invention, the foregoing and other objects are accomplished by providing a unique system which utilizes an electronic counting mechanism to determine the amount of movement of the gate between the open and closed positions. The system also employs a microprocessor computer which controls the movement of the gate between the open and closed positions. The microprocessor includes means for storing the initial amount of movement of the gate as it travels between the fully open and the fully closed positions. By employing electronic means for determining the length of travel of the gate, the system of the present invention completely eliminates the need for mechanical sensors, such as limit switches, to detect the position of the gate. It is believed that this is the first time an electronic system of this type has been employed to control the opening and closing of a gate.

The electronic counting mechanism used to determine the amount of movement of the gate includes an electro-optical position transducer for determining the position of the gate. The position transducer is in the form of an encoder which provides an output signal in the form of a pulse train where each pulse represents movement of the gate over an incremental distance. Gate movement is provided by a motor, clutch and gear train assembly. The system of the present invention also includes electronic circuitry responsive to the output signal of the position transducer for determining when the gate is either fully open or fully closed and also for determining when the gate motion is obstructed. The electronic circuitry employs a central processor in the form of a microprocessor which counts and stores the number of pulses provided by the position transducer as the gate moves from a fully opened position to a fully closed position. This count represents the full travel of the gate and enables the electronic circuitry to determine the position of the gate by comparing the number of pulses provided by the position transducer to the stored number of pulses representing the full travel of the gate. This pulse comparison enables the system of the present invention to detect when the gate is at either the fully open or fully closed position without the need for limit switches or other mechanical components and is fully automatic and requires no adjustments. The motion of the gate may also be interrupted during its travel by means of a key or safety device, and the motion of the gate is reversed in response to the actuation of such devices. The system keeps track of the position of the gate during these operations and automatically deenergizes the gate drive motor when the gate reaches an end of travel position.

The system of the present invention is also capable of detecting when the gate encounters an obstruction during its travel by detecting an interruption in the pulse waveform provided by the position transducer. If an obstruction is encountered, the gate drive motor is deenergized. Depending on whether the gate was opening or closing during the obstruction, the system electronic circuitry is configured to reverse the gate motion to permit removing the obstruction. At the same time, the circuitry is resynchronized to the end of travel position of the gate. This resynchronizing procedure ensures that the system electronics remains synchronized to the end of travel position of the gate even after the gate motion has been disturbed by an obstruction.

The system of the present invention also includes a variety of optional operating modes which may be selected by the operation of appropriate electrical switches without the need for any adjustments. One optional operating mode includes an automatic close feature which automatically closes the gate after a prescribed time interval has elapsed. Another optional operation mode permits the system to be used to control two simultaneously operated gates, known as bi-parting gates. In this mode, the system ensures the synchronized motion of the two gates in response to output signals from electro-optical position transducers operatively coupled to each gate. A microprocessor computer is employed within the system of the present invention to perform all of the logic and timing functions required for the above-described operation of the system.

These and other objects, features and advantages of the invention will become apparent from the reading of the specification when taken in conjunction with the drawings in which like reference numerals refer to like elements in the several figures.

DESCRIPTION OF THE PREFERRED EMBODIMENT

Figure 1:
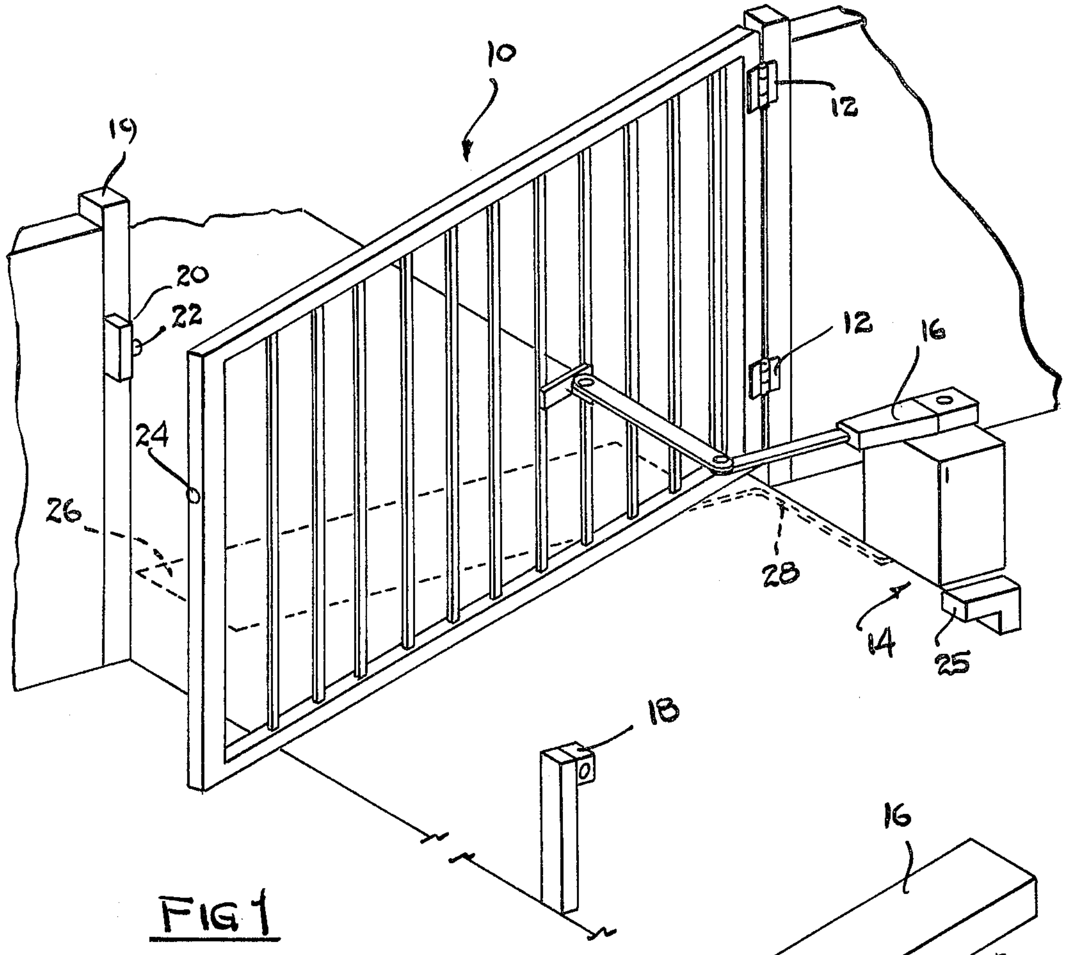
FIG. 1 is a perspective view showing a swinging gate which may be controlled by the system of the present invention.

FIG. 1 shows a perspective view of a sliding gate 10 which may be controlled by the automatic control system of the present invention. The gate 10 is rotatably mounted to a structure by means of hinges 12. The various mechanical and electrical components of the automatic control system are housed within a suitable weatherproof enclosure 14 positioned as shown in FIG. 1. As described below, the mechanical output of the automatic control system is in the form of a rotating shaft which projects through the top of the housing 14 and is operatively connected to one end of a hinged control rod 16. The other end of the control rod 16 is fastened to the gate 10. Movement of the control rod 16 causes the gate 10 to open or close, depending on the direction of rotation of the rod 16.

Also shown in FIG. 1 is an electrical switch 18 used to operate the gate 10. The switch 18 may be in the form of a key-operated switch which restricts the operation of the gate 10 to authorized personnel. Several switches 18 may be placed at various locations in the vicinity of the gate 10 for its operation. Typically, a switch 18 is located on both sides of the gate 10 to provide operation for entry and exit from the gated area. To provide additional security of the gate 10 in the closed position, a lock 20 including an electrically-operated dead bolt 22 is mounted to a gate post 19 as shown in FIG. 1. The automatic control system of the present invention controls the operation of the lock 20 to enable the dead bolt 22 to engage the gate 10 by means of a clearance hole 24 when the gate 10 is in the closed position. The fully closed position of the gate 10 is defined by the gate post 19, and the fully open position of the gate 10 is defined by a mechanical stop 24 as shown in FIG. 1.

The automatic control system of the present invention is also capable of operating the gate 10 in response to a variety of safety devices. These safety devices are typically positioned adjacent the gate 10 to detect potential obstructions. Such safety devices may take the form of interruptable light beams and RF loop detectors well known to those skilled in the art. A safety device in the form of a loop detector 26 is shown in FIG. 1. Typically, loop detectors are buried in the ground in an area adjacent the gate 10 and detect the motion of objects by means of radio frequency waves. The loop detector 26 is connected to the electronics within the enclosure 14 by means of a cable 28. In like manner, the key switch 18 and the electrically-operated dead bolt 22 are connected to the electronics within the enclosure 14 by means of cables not shown in FIG. 1.

Figure 2:
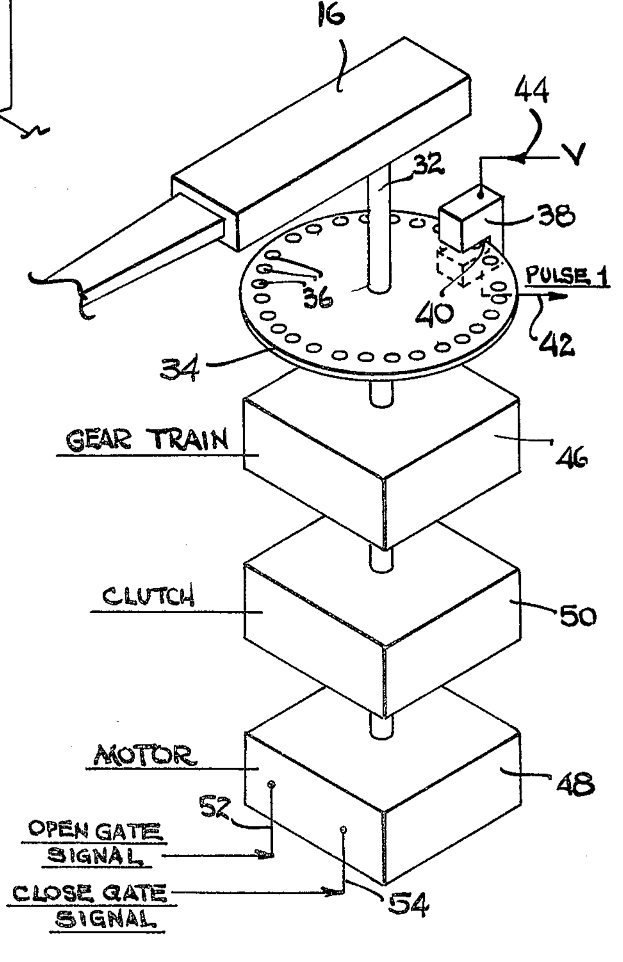
FIG. 2 is a block diagram showing the operation of the electro-optical position transducer used in the system of the present invention.

Referring now to FIG. 2, there is shown a block diagram illustrating the mechanical components including the position transducer used in the automatic control system of the present invention. The control rod 16 is connected to the output of a gear train 46 by means of a shaft 32, the upper end of which protrudes through the top of the enclosure 14 shown in FIG. 1. Axially mounted to the shaft 32 is a disk 34 formed of an opaque material such as plastic and including a plurality of apertures 36 equally spaced around the periphery of the disk 34. The motion of the disk 34, and hence the control arm 16, is sensed by means of a position sensor 38 which, in the preferred embodiment, is in the form of a photo-interruptor well known to those skilled in the art. The sensor 38 is generally C-shaped, forming a slot 40 through which the periphery of the disk 34 rotates. Mounted to one side of the slot 40 is a light source such as a light-emitting diode. Mounted to the opposing side of the slot 40 is a photo detector such as a photo transistor. The light source projects a beam of light across the slot 40, which light is directed by the photo transistor. When an object passes through the slot 40 it interrupts the light beam and causes an electrical output signal from the photo transistor in the form of a pulse. Accordingly, as the disk 34 rotates, the alternating clear and opaque sections formed by the apertures 36 provide an output signal from the sensor 38 in the form of a pulse train appearing on line 42. Power for the light source within the sensor 38 is provided on input line 44. The relative spacings of the apertures 36 determine the resolution with which the sensor 38 can determine the incremental motion of the control rod 16 and, hence, the gate 10.

The lower end of the shaft 32 is operatively coupled to the output of the gear train 46. The input of the gear train 46 is, in turn, coupled to the output of a motor 48 by means of a clutch 50. The motor 48 which is a reversible type is, in turn, controlled by means of signals appearing on either line 52 or 54. An open gate signal appearing on line 52 causes rotation of the motor 48 in a direction which opens the gate 10. In like manner, a close gate signal appearing on the line 54 causes rotation of the motor 48 in a direction to close the gate 10. All of the components shown in FIG. 2, with the exception of the control rod 16, are housed within the weatherproof enclosure 14 shown in FIG. 1. Detailed descriptions of the above described components may be found in applicant's prior copending application Ser. No. 126,717, filed Mar. 3, 1980, of which this application is a continuation-in-part.

The operation of the mechanical portion of the automatic control system of the present invention described above is as follows. When the gate 10 is commanded to move open or closed, an appropriate signal is provided on either the line 52 or the line 54 to the motor 48 by the electronic circuitry of the control system as described below. The mechanical output of the motor 48 is coupled to the control rod 16 by means of the clutch 50 and the gear train 46. The gear train 46 converts the relatively high speed, low torque output of the motor 48 into a relatively slow speed, high torque rotation of the shaft 32 and the control rod 16. As the rod 16 rotates and moves the gate 10, pulses are provided on the line 42 from the sensor 38 in response to the rotation of the disk 34, where each pulse represents motion of the gate 10 over an incremental distance which is a function of the spacing of the apertures 36. In the preferred embodiment, the apertures 36 are spaced so that each pulse appearing on the line 42 represents an incremental distance of one inch in the motion of the free end of the gate 10.

If the motion of the gate 10 is stopped by means of an obstruction, the disk 34 also stops rotating, with the result that pulses no longer appear on the line 42. This event is employed by the circuitry of the control system to detect a gate obstruction as described below. In addition, when the motion of the gate 10 is obstructed, the clutch 50, which is typically in the form of spring-loaded disks, slips to prevent damage to either the motor 48 or the gear train 46, and to limit the amount of force exerted by the gate 10 on the obstruction.

Figure 3:
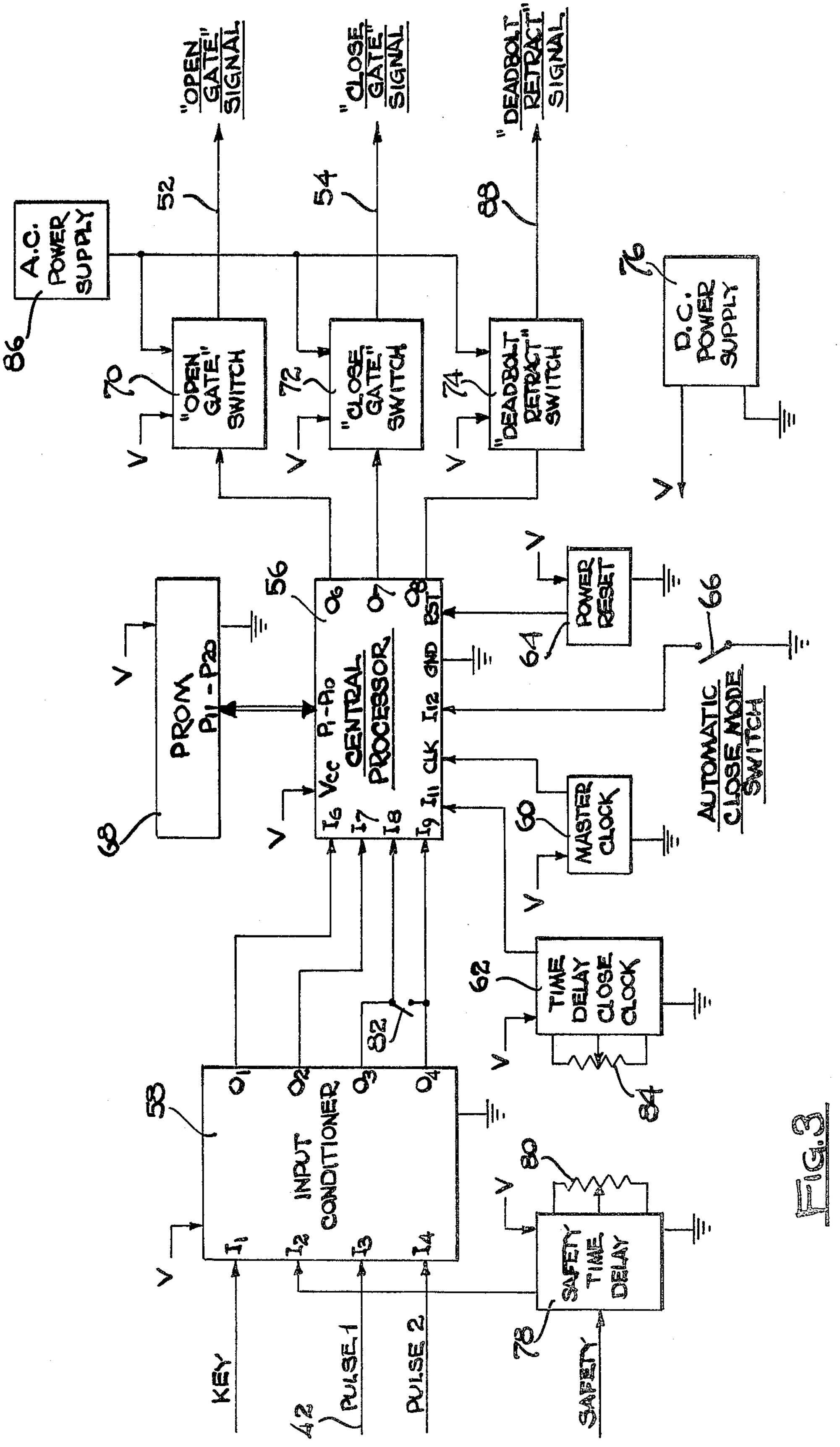
FIG. 3 is a block diagram showing the operation of the automatic control system of the present invention.

Referring now to FIG. 3, there is shown a block diagram illustrating the operation of the electronic circuitry of the preferred embodiment of the automatic control system of the present invention. As is shown therein, the automatic control system includes a central processor 56 which receives its input signals from a variety of sources including an input conditioner 58, a master clock 60, a time-delay close clock 62, a power reset circuit 64, and an automatic close mode switch 66.

As will be understood by those skilled in the art, the controller 56 may be implemented in any of a number of different ways. However, as with many prior art control circuits, the preferred embodiment of the invention utilizes an integrated circuit microprocessor (a miniature digital electronic computer). Such integrated circuit microprocessors are well known and include all of the input, output, memory, logic and control circuitry of a special purpose digital computer in miniature form. In general, such circuits have both random access memory (RAM memory) and read only memory (ROM memory). Alternatively, the microprocessor may be connected to an external programmable read only memory (PROM memory). The PROM memory may be programmed by the user by applying external electrical signals which permanently alter the circuit within the PROM to form a dedicated memory circuit. The RAM memory of the central processor is utilized for storage of the various transient bits of information and program during the operation of the circuit. Various controller circuits are offered by a number of manufacturers and are well known to those skilled in the art. A preferred embodiment of the present invention utilizes a COP-402 microcontroller manufactured by National Semiconductor. This circuit is better described in the *COPS Chip User's Manual* published by National Semiconductor.

Returning to FIG. 3, it can be seen that the central processor 56 is connected to communicate with a PROM 68. In response to the input signals described above, the central processor 56 also provides necessary output signals to an open gate switch 70, a close gate switch 72 and a dead-bolt retract switch 74. As described below, the switches 70, 72 and 74 are used to control the motor 48 and the dead bolt 22. All of the various circuits described above including the position sensor 38 receive their operating power from a DC power supply 76.

The input conditioner 58 receives an input signal at input terminal $I_1$ from one or more of the key switches 18 shown in FIG. 1. This key signal is in the form of a switch closure which occurs in response to the actuation of one or more key switches 18 to cause the gate 10 to move. A second input signal is provided to the input conditioner 58 at input terminal $I_2$ from a safety time delay circuit 78. The safety time delay circuit 78, in turn, receives a safety input signal which is derived from any of a number of safety devices including the loop detector 26 shown in FIG. 1. The time delay circuit 78 provides an adjustable time delay between the time of receipt of the safety signal and the occurrence of an output signal from delay circuit 78 to the input terminal $I_2$ of the conditioner 58. This time delay duration may be varied by the user by adjusting a variable resistor 80.

Input conditioner 58 receives a third input signal, labelled "pulse 1" in FIG. 3, at input terminal $I_3$. Referring to FIG. 2, it can be seen that the "pulse 1" signal is the output signal from the position sensor 38 appearing on the line 42. Input conditioner 58 may also receive a fourth input signal, labelled "pulse 2" in FIG. 3, and appearing at input terminal $I_4$. The "pulse 2" signal is provided whenever two gates are used in a bi-parting arrangement which requires the two gates to be operated in synchronism. Such a bi-parting arrangement of two gates is typically used when the gated passageway is sufficiently wide to make the use of a single gate impractical. Referring to FIG. 2, all of the mechanical components shown for operating a single gate, including the disk 34 and the position sensor 38, are duplicated for driving the second gate in a bi-parting configuration. As described below, the signals to the motor 48 for controlling the first gate are connected in parallel to the motor controlling the second gate. The position sensor used to detect the motion of the second gate provides the output signal "pulse 2" which is applied to the input conditioner 58 at the input terminal $I_4$.

Input conditioner 58 includes a variety of circuits well known to those skilled in the art for debouncing and filtering inputs in the form of switch closures. Accordingly, in response to the input signals appearing at the terminals $I_1$, $I_2$, $I_3$ and $I_4$, the input conditioner 58 provides, respectively, output signals at terminals $O_1$, $O_2$, $O_3$ and $O_4$, which are of the proper amplitude and wave shape for use in controlling the central processor 56. Signals from the output terminals $O_1$, $O_2$, $O_3$ and $O_4$ of conditioner 58 are provided respectively, to input terminals $I_6$, $I_7$, $I_8$ and $I_9$ of central processor 56. A mode selection switch 82 is connected between the input terminals $I_8$ and $I_9$ of the processor 56 and is used to signal the processor 56 whenever control of two gates is required.

The master clock 60 is in the form of a high-frequency oscillator and provides a timing signal to input terminal CLK of processor 56, which is used to cycle the processor 56 through its various logic steps. The time delay close clock 62 is in the form of a low frequency oscillator which supplies a timing signal at input terminal $I_{11}$ of the processor 56. The time delay close clock 62 is used to set the time delay employed as part of the automatic close mode of operation of the control system. This automatic close mode is selected by means of the switch 66, which furnishes a signal at input terminal $I_{12}$ of processor 56. The user may adjust the duration of the time delay in the automatic close mode by adjusting a variable resistor 84. The power reset circuit 64 provides a signal at input terminal RST of processor 56 which is used to reset and initialize the appropriate logic circuits of the processor 56 whenever operating power from the supply 76 is first applied or interrupted.

Terminals $P_1$–$P_{10}$ of the processor 56 are connected, respectively, to terminals $P_{11}$–$P_{20}$ of the PROM 68 and provide communications channels between the processor 56 and the PROM 68 whereby the PROM 68 provides the program for operating the processor 56.

Output terminal $O_6$ of the processor 56 is connected to operate the open gate switch 70 which provides a switch closure between an AC power supply 86 and the input line 52 of the motor 48. Accordingly, a signal appearing at the output terminal $O_6$ of the processor 56 results in AC power being supplied to operate the motor 48 in a direction to open the gate 10. In like manner, output terminal $O_7$ of processor 56 is connected to operate the close gate switch 72. In response to a signal appearing at the terminal $O_7$ of the processor 56, the close gate switch 72 provides a switch closure between the AC power supply 86 and the input line 54 of the motor 48 to command the motor 48 to close the gate 10.

Output terminal $O_8$ of processor 56 is connected to operate the dead bolt retract switch 74. In response to a signal appearing at the terminal $O_8$ the switch 74 provides a switch closure between the AC power supply 86 and a line 88 which is connected to retract the dead bolt 22 of the lock 20 shown in FIG. 1. In the preferred embodiment, the switches 70, 72 and 74 are in the form of Triacs controlled by photo-isolator circuits well known to those skilled in the art. The photo-isolator circuits provide electrical isolation between the low voltage DC power supply 76 and the high voltage AC power supply 86, the Triacs provide the means for switching the AC power supply 86 to control the various mechanical loads.

The operation of the automatic control system thus described is as follows. Referring to FIGS. 1 and 3, it is assumed that a single gate 10 is to be controlled for the first time from a closed position and that the automatic close mode has not been selected. When power is first applied to the circuit of FIG. 3 the power reset circuit 64 signals the processor 56 that this is the first operation of the gate 10. When the user operates the key switch 18, a signal appears at the input terminal $I_1$ of conditioner 58 and subsequently at the input terminal $I_6$ of processor 56. In response to this signal, the processor 56 provides an output signal to the switch 74 which causes the dead bolt 22 to retract, permitting the gate 10 to move open. After a short pause to allow for the operation of the dead bolt 22, the processor 56 provides an output signal to the switch 70 which causes the motor 48 to open the gate 10.

As the gate 10 is moving open, an output signal in the form of pulses is generated by the position sensor 38 and these pulses are provided to the input conditioner 58 at the input terminal $I_3$ and subsequently to the input terminal $I_8$ of the processor 56. The processor 56 begins counting each of these pulses as soon as the gate 10 begins moving. The processor 56 is capable of counting pulses from two separate position sensors when two gates are being operated simultaneously. When only one gate is being operated, the switch 82 shown in FIG. 3 is closed, connecting the input terminals $I_8$ and $I_9$ together so that the pulses appearing on the line 42 are provided to both the inputs $I_8$ and $I_9$ of the processor 56.

The gate 10 will continue opening until it comes into contact with the mechanical stop 25 which represents the full open position as shown in FIG. 1. When this event occurs, the gate 10 is restrained from further motion, causing the clutch 50 to slip and also causing the pulses appearing on the line 42 to stop. With the pulses no longer appearing on the line 42, the processor 56 deenergizes the motor 48 and the gate 10 remains in the full open position. The processor 56 also deenergizes the dead bolt 22, permitting it to return to its extended position.

Since the automatic close mode has not been selected, the gate 10 remains in the open position until the user reactivates the key switch 18, at which time the processor 56 provides an output signal to the switch 72, causing the motor 48 to begin closing the gate 10. At the same time, the sensor pulse count accumulated by the processor 56 is reset to zero and the dead bolt 22 is again commanded to the retracted position. During the closing of the gate 10, the processor 56 again counts the number of pulses provided by the position sensor 38, beginning from the full open position of the gate 10. When the gate 10 reaches the fully closed position and contacts the gate post 19 shown in FIG. 1, the clutch 50 slips, the disk 34 stops rotating, and the position sensor 38 no longer provides pulses on the line 42. Accordingly, the processor 56 deenergizes the motor 48 and releases the dead bolt 22, locking the gate 10 in closed position. At the same time, the processor 56 stores the total number of pulses counted as the gate 10 moved from the full open to the full closed position in a storage register which represents the full travel distance of the gate 10.

When the user actuates the key switch 18 for subsequent opening of the gate 10, the central processor 56 repeats the operations described above, retracting the dead bolt 22 and energizing the motor 48 to operate the gate 10. In this case, however, the processor 56 counts the number of pulses from the position sensor 38 and compares this number to the count previously stored in the full travel register. When the number of pulses generated by the motion of the gate 10 equals the number of pulses stored in the full travel register, the processor deenergizes the motor 48. This position, of course, corresponds to the full open position of the gate 10. By storing the number of pulses which represent the full travel motion of the gate 10, the processor 56 can determine when the gate 10 is at the full open and full closed positions. Consequently, the gate 10 may be stopped at either of these positions by the processor 56 so that the gate 10 does not slam into contact with either the open or closed stops 25 or 19, and the clutch 50 is not required to slip. Thus, the stored pulses from the position detector 38, in conjunction with the processor 56, perform the functions of the mechanical limit switches used in prior art gate control systems to sense the end of travel positions of the gate 10.

If, during the time that the gate 10 is closing, the user actuates the key switch 18 or a safety device such as the loop detector 26 detects an obstruction, the processor 56 will stop the gate, and reverse its direction. The response of the processor 56 to an actuation of the key switch 18 is instantaneous, while the response of the processor 56 to a signal from safety devices such as the loop detector 26 is delayed by an interval of time which may be varied by the user. Referring to FIG. 3, an obstruction causes the loop detector 26 to provide a safety signal to the input of the safety time delay 78. The reason for this time delay is to enable the control system to discriminate between a true obstruction of the gate 10 as opposed to the transient motion of a passing object. By adjusting the variable resistor 80, the user may vary the safety time delay up to four seconds in the preferred embodiment.

When the closing motion of the gate 10 is stopped in response to the actuation of a key switch or the detection of an obstruction, the processor 56 counts the number of pulses received from the position sensor 38 over the interval from the full open position to the position where the gate 10 was stopped. The processor 56 then reverses the direction of motion of the gate 10, causing it to open until the processor 56 detects that the gate 10 has returned to the full open position as indicated by the pulses generated by the sensor 38. Accordingly, the processor 56 is capable of monitoring the incremental position of the gate 10 so that it may return the gate 10 to a fully open position from a partially closed position.

The pulses generated by the position sensor 38 are also used by the processor 56 to detect when the gate 10 has encountered an obstruction during its travel in the following manner. Assuming that the gate 10 encounters an obstruction while opening, which may be in the form of a vehicle, pedestrian or other object blocking the motion of the gate 10, the clutch 50 disengages, the pulses provided by the sensor 38 cease, and the processor 56 deenergizes the motor 48. It has been found that when the gate 10 encounters an obstruction, the pulse count representing the position of the gate 10 and stored by the processor 56 may not accurately reflect the position of the gate 10. For example, the gate 10 might be caused to bounce against an obstruction which causes transient motion of the disk 34 and generates erroneous pulses from the position sensor 38. These pulses are counted by the processor 56 but do not truly reflect the continuous motion of the gate 10. Accordingly, when the gate 10 encounters an obstruction during its travel, provisions are made to enable the processor 56 to be resynchronized with the motion of the gate 10. For example, after the opening motion is interrupted by an obstruction and the gate 10 is commanded to close, the number of pulses stored in the processor 56 representing the position of the gate 10 is reset to zero. When the gate 10 reaches the fully closed position its motion is again stopped by contact with the post 19, causing pulses from sensor 38 to cease. The processor 56 detects this event as another obstruction and again resets the pulse count representing the position of the gate 10 to zero and reverses the motion of the gate 10 to reopen it. Assuming that the obstruction has been removed, the gate 10 continues to the full open position and during its motion the processor 56 counts the number of pulses from the fully closed position to the fully open position. The motion of the gate 10 is stopped when the number of pulses thus counted equals the stored number representing full travel. It can be seen that the prior sequence of events ensures that the processor 56 is resynchronized to the motion of the gate 10 after an obstruction is encountered on gate opening.

In like manner, if the closing motion of the gate 10 is interrupted by an obstruction, the pulse count will again be reset to zero and the processor 56 will automatically reverse the motion of the gate 10, returning it to the full open position. Assuming that the obstruction has been removed and that the gate has not been recommanded to close, the processor 56 resets the pulse count to zero and the gate 10 moves from the full open position to the full closed position. During this motion the processor 56 properly counts the number of pulses corresponding to full travel, and deenergizes the motor 48 when the gate 10 has reached the fully closed position. Accordingly, the pulse count stored by the processor 56 is again resynchronized with the motion of the gate 10.

The user may select the automatic close mode for the operation of the control system of the present invention, by closing the switch 66 shown in FIG. 3. In the automatic close mode, the operation of the control system is identical to the operation described above except that the closing motion of the gate 10 does not require the user to actuate the key switch 18. Instead, after the gate 10 has opened, the processor 56 will automatically actuate the motor 48 to close the gate 10 after a predetermined time delay has elapsed. This time delay is determined by the time delay close clock 62 shown in FIG. 3, and in the preferred embodiment this delay may be varied over a range of five to seventy seconds by adjusting the variable resistor 84. Accordingly, when the gate 10 has reached its full open position during normal operation, it will remain in that position for a duration as set by the time delay close clock 62. When this time duration has elapsed, the gate 10 will automatically begin closing.

If, while the gate 10 is in the full open position and during the time delay close interval, either the key switch 18 or the loop detector 26 is activated, the processor 56 will reset the time delay and begin counting the automatic close time from the last actuation of either the key switch 18 or the loop detector 26. Thus, the user may actuate the key switch 18 to delay the automatic closing of the gate 10. If the automatic close mode is activated and the opening motion of the gate is interrupted by an obstruction, the motion of the gate 10 will be automatically reversed after the time delay close interval has elapsed.

As described above, the control system of the present invention may also be used to control two gates in a bi-parting configuration. Referring to FIGS. 1 and 2, all of the elements shown for a single gate are duplicated for a second gate. Thus, a two gate system includes two locks 20, two motors 48, and two position sensors 38. There may also be a plurality of key switches 18 and loop detectors 26. The control elements associated with the second gate are connected to the control system of FIG. 3 in the following manner. The motors controlling both gates are connected in parallel so that the signals appearing on the lines 52 and 54 operate both motors simultaneously. In similar fashion the dead bolt locks 20 are connected in parallel so that the signal appearing on the line 88 operates both dead bolts simultaneously. The "pulse 1" signal appearing on the line 42 from the sensor 38 of the first gate is connected to the input $I_3$ of the input conditioner 58 as described above. In like manner, a second signal referred to as "pulse 2" is connected from the position sensor of the second gate to the input $I_4$ of the conditioner 58. By opening the switch 82 shown in FIG. 3, the signals "pulse 1" and "pulse 2" are separately provided as inputs to processor 56 at input terminals $I_8$ and $I_9$.

The processor 56 performs all of the same functions described above for a single gate with the following exceptions. The processor 56 counts the number of pulses appearing at both input terminals $I_8$ and $I_9$. During the first operation of the two gates the processor 56 stores the larger number of pulses accumulated after full travel of both gates as representative of the full travel of either gate. In the subsequent opening and closing of the gates, the processor 56 stops the motion of both gates when the count of pulses appearing at either input terminal $I_8$ or $I_9$ is equal to the previously stored full travel count. It has been found that this configuration for operation of two gates results in synchronized motion of both gates, since the number of pulses generated by the individual sensors for each gate are typically within one pulse of each other. By using the larger count of pulses for full travel, this ensures that both gates will reach full open and full closed positions.

From the above discussion, it can be seen that the automatic control system of the present invention is capable of controlling one or two gates in a variety of modes without the need for limit switches or mechanical adjustments of any kind. The method in which the processor 56 determines the full travel distance of the gate 10 represents an adaptive control scheme which permits the control system to be used with gates having varying configurations and travel distances.

The processor 56 maintains a count representing full travel motion of the gate 10 as long as power is supplied to the processor 56. In the event of loss of power, the control system is reinitialized when power is reapplied by means of the power reset circuit 64, which signals the processor 56 to restore a new count representing full travel position during the next operation of the gate 10.

Figure 4:
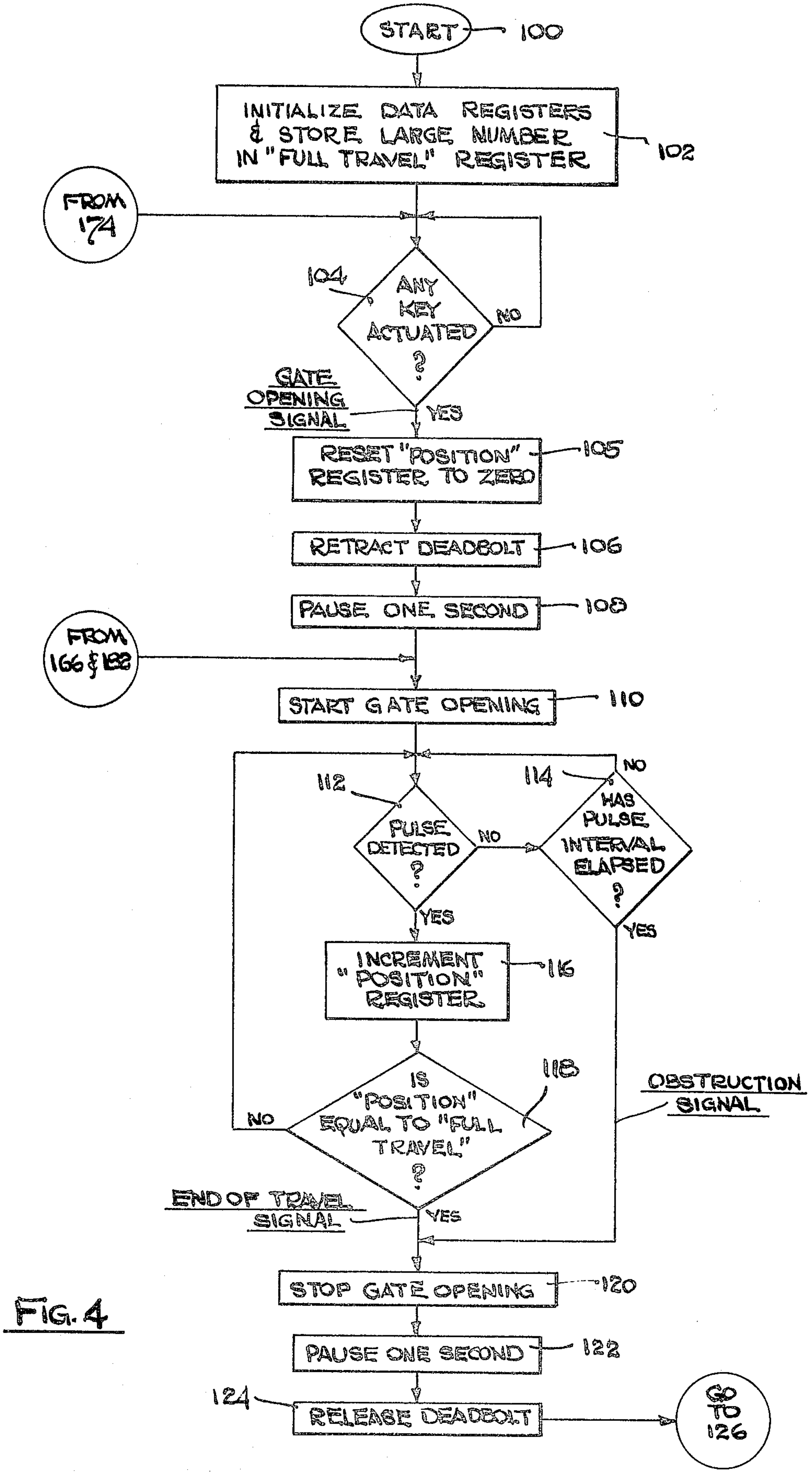
FIGS. 4, 5A and 5B are flow charts showing the program and operation of the preferred embodiments of the automatic control system of the present invention.
Figure 5A:
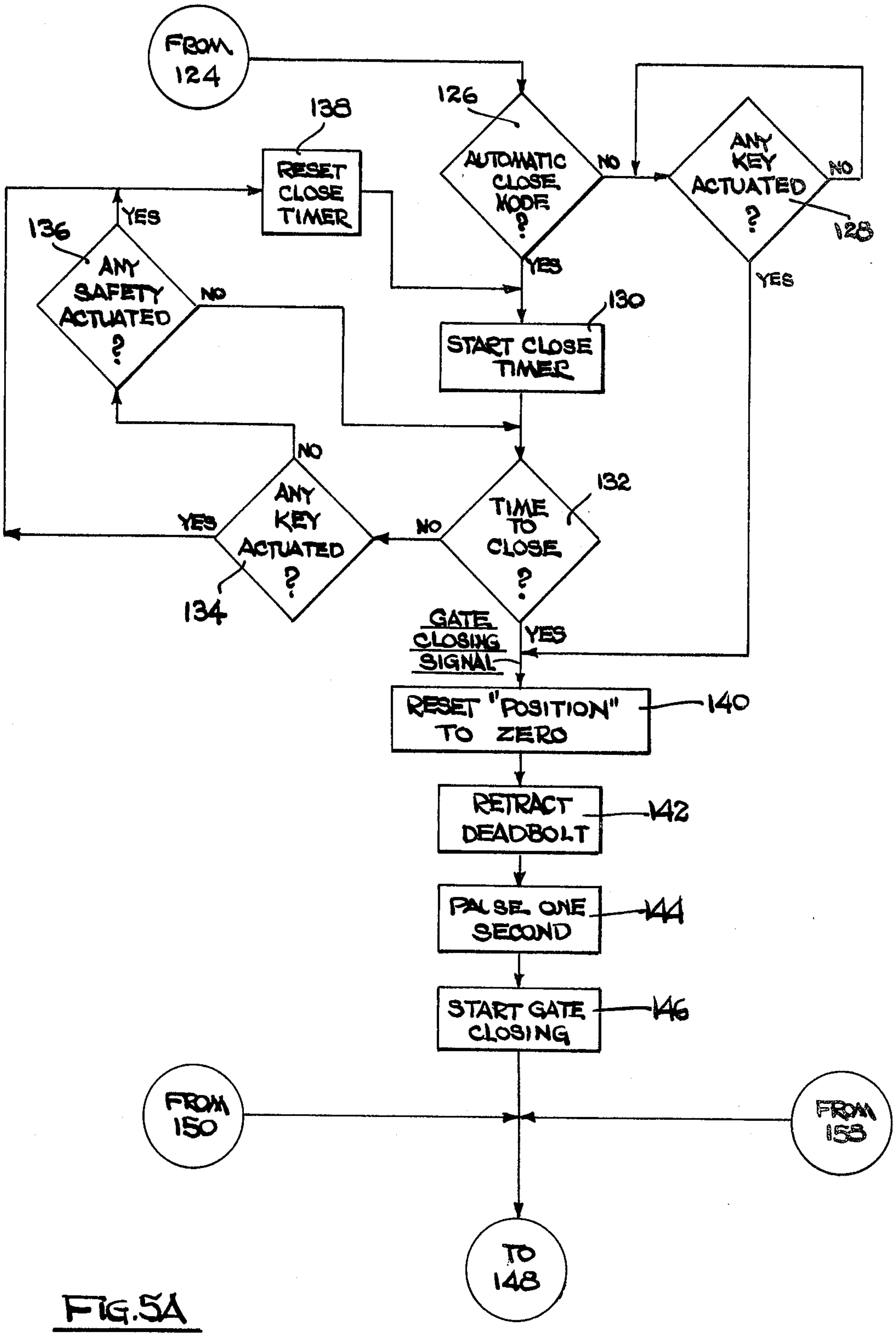
Figure 5B:
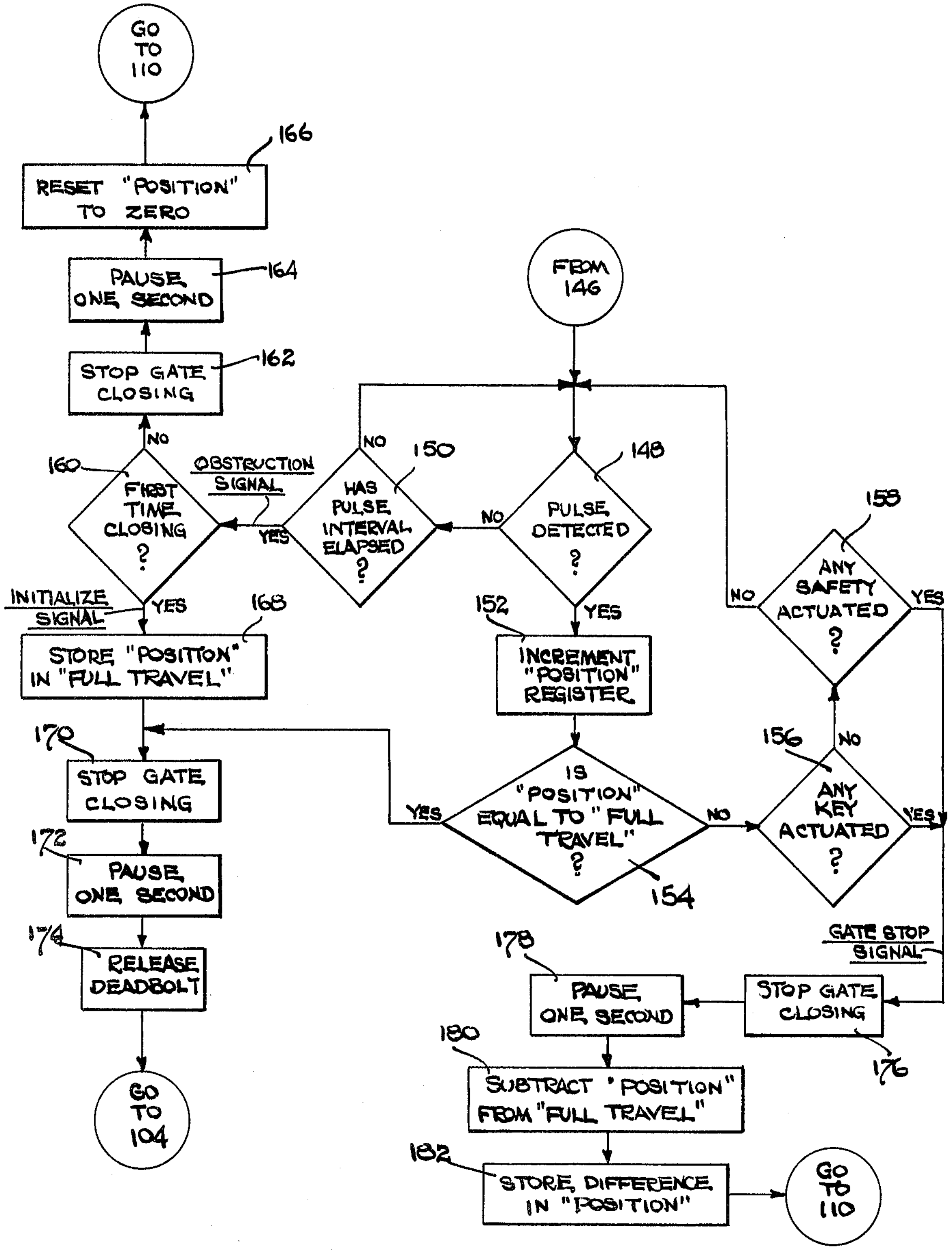

Referring now to FIGS. 4 and 5, there is shown a series of flow charts which illustrate a program which may be used to control the central processor 56 and the PROM 68 to perform the functions of the control system of the present invention. As shown in FIG. 4, the program begins at step 100 in FIG. 4, which corresponds to the application of power to the circuit shown in FIG. 3. The program moves to step 102 where the data registers in the processor 56 are initialized and, in particular, a large number is stored in the full travel register. The full travel register is used to store the pulse count representing the full travel of the gate 10 from the open to the closed position. Since this count has not been determined yet, a large number is temporarily stored in this register to enable the program to sequence through its routine as described below.

The program moves to step 104 to determine if any key switch 18 has been actuated. If not, the program continues in a waiting loop around step 104 until the key switch 18 is activated, requesting motion of the gate 10. When the key switch 18 is activated, the program moves to step 105 where the position register is set to zero. The position register stores the count of pulses which represents the motion of the gate 10 from its last known position. The program then moves to step 106 where the dead bolt 22 of the lock 20 is retracted. The program pauses at step 108 for one second to allow sufficient time for the retraction of the dead bolt 22. At step 110 the program begins opening the gate 10, and at step 112 determines if pulses are being received from the position sensor 38.

If at decision step 112 it is determined that no pulses are being received by the processor 56 from the sensor 38, the program moves to step 114 to determine if a fixed interval of time has elapsed since the previous pulse was detected. Referring to FIG. 2, the rate at which the pulses are generated by the sensor 38 is a function of the rate of rotation of the shaft 32 and the spacings between adjacent apertures 36. Based on these two values, a time interval is stored within the processor 56 representing the duration between pulses when the gate 10 is moving without obstruction.

Returning to FIG. 4, if the interval between pulses has not elapsed, the program moves from step 114 back to step 112 and continues to monitor the output of the sensor 38 for pulses. If pulses are still not detected, and at step 114 it is determined that the interval between pulses has elapsed, it is assumed that the opening motion of the gate 10 has been stopped by an obstruction and the program moves from step 114 to step 120 to stop the gate opening by deenergizing the motor 48.

Returning to step 112, if a pulse is detected from the sensor 38, the program moves at step 116 to count these pulses by incrementing the position register. The program moves at step 118 to determine if the count of pulses in the position register is equal to the count of pulses in the full travel register. Since this is the first time through the program, a number has been temporarily stored in the full travel register, which is larger than any possible pulse count which can be accumulated by the motion of the gate 10. Accordingly, the program will move from step 118 to step 112 and continues to accumulate pulses while the gate moves to an open position. If no obstructions are encountered during the opening motion of the gate 10, the gate will eventually contact the mechanical stop 25 representing the full open position of the gate. At this point, the pulses will no longer be provided by the sensor 38 and, accordingly, the program will move from step 112 to step 114 to step 120, where the gate opening motion is stopped. The program at step 122 pauses for one second and then, at step 124, releases the dead bolt 22. The program then moves from step 124 in FIG. 4 to step 126 in FIG. 5.

The program, at step 126, determines if the automatic close mode has been selected. If not, the program moves to step 128 to determine if any key switches 18 have been actuated, and if they have not, the program remains in a waiting loop around step 128 until a key switch 18 is actuated. Thus, the gate 10 remains in either the full open position or the last position at which its motion was stopped due to an obstruction. When the key switch 18 has been actuated, the program moves from step 128 to step 140.

Returning to step 126, if it is determined that the automatic close mode has been selected, the program moves to step 130 where a timer is initiated as a function of the time delay close clock 62 shown in FIG. 3. At step 132, the program determines whether the selected time delay has elapsed and, thus, whether it is time to close the gate 10. If the time delay has not elapsed, the program moves to steps 134 and 136 to determine respectively if any key switch 18 has been actuated or if any safety device such as the loop detector 26 has been actuated. If either a key switch or a safety device has been actuated, the program moves to step 138 where the timer for the automatic close mode is reset to zero to reinitialize the close time delay. The program then moves to step 130 to restart the timer. If, at steps 134 and 136, it is determined that no key switches or safety devices have been actuated, the program moves from step 136 to step 132 to determine if the time delay has elapsed. When the automatic close time delay has elapsed, the program moves from step 132 to step 140.

Beginning with step 140, the program moves through the necessary steps to close the gate 10. At step 140, the program resets the position register to zero to synchronize the position register to the fully open position of the gate 10. The program moves at step 142 to retract the dead bolt 22, pauses one second at step 144, and begins closing the gate at step 146. At step 148 the program determines if pulses are being provided by the position sensor 38. If no pulses are detected, the program moves at step 150 to determine if the time interval between pulses has elapsed. If not, the program cycles back to step 148. It is assumed that the gate motion was not interrupted during the previous opening of the gate 10 so that it has reached the full open position, and that the gate 10 is now closing from that full open position without obstruction. Accordingly, pulses are provided during gate closing from the sensor 38 and the program moves from step 148 to 152, where the number of pulses are stored by incrementing the position register. At step 154 the program compares the stored count in the position register to the contents of the full travel register which still contains a large number. Accordingly, the position register will not be equal to the full travel register, and the program will move from step 154 to step 156.

If, at steps 156 or 158, it is determined that a key switch or a safety device has been actuated, the program moves to step 176, where the gate closing motion is stopped. If there has been no key switch or safety device actuated, the program moves from step 156 to step 158 to step 148 where the gate closing motion continues until the gate reaches the fully closed position and contacts the gate post 19 shown in FIG. 1. When this occurs, no further pulses are detected and the program will move from step 148 to step 150 to step 160, where it is determined if this is the first time for closing the gate 10.

Since this is the first time gate 10 is being closed after applying power to the control system, the program moves to step 168 where the pulse count that has been stored in the position register is transferred to the full travel register in place of the large number that was stored in that register at step 102. Accordingly, at step 168, the position register count, which corresponds to the number of pulses generated by the sensor 38 in response to the gate 10 traveling from the full open position to the full closed position, is transferred to the full travel register and is used by the processor 56 to determine when the gate 10 is at the end of travel. The program moves to step 170 where the motor 48 is deenergized to stop gate closing motion. The program pauses one second at step 172 to allow the gate 10 to come to a full rest position, and at step 174, releases the dead bolt 22 to lock the gate in the fully closed position. The program then cycles back to step 104 in FIG. 4 to determine if any key switch is actuated to command the gate 10 to open.

Now that the program has stored the proper pulse count in the full travel register, the sequence of events for subsequent openings of the gate 10 is as follows. The program moves at step 105 to reset the position register to zero, which synchronizes the pulse count to the full closed position of the gate 10. The program then moves at step 106 to retract the dead bolt, at step 108 to pause one second, and at step 110, to begin opening the gate. Assuming no obstructions, the program detects pulses from the sensor 38 at step 112 and increments the position register at step 116. When the gate 10 has reached the full open position the contents of the position register are equal to the contents of the full travel register as detected at step 118. The program then thus stops the gate opening motion at step 120 so that the gate then will not contact the stop 25 at the open gate position. Accordingly, the clutch 50 in FIG. 2 is not caused to slips and no large mechanical loads are imposed on the gate 10, the gear train 46 or the motor 48.

In like manner, for subsequent closings of the gate 10 the program resets the contents of the position register to zero at step 140 in FIG. 5, retracts the dead bolt 22 at step 142, pauses one second at step 144, and begins gate closing at step 146. Assuming no obstructions to the gate closing motion, pulses will be detected at step 148 and counted and stored in the position register at step 152. When the gate 10 reaches the fully closed position, the number of pulses in the position register will be equal to the number of pulses stored in the full travel register. This equality is detected at step 154 and the program at step 170 deenergizes the motor 48 to stop the gate closing motion. Thus, the gate 10 is brought to a stop at the fully closed position without the need to contact the gate post 19.

If, during the closing motion, either a key switch or a safety device had been actuated, the program detects this actuation at either step 156 or 158 in FIG. 5, and stops gate closing motion at step 176. After pausing one second at step 178, to allow the gate to come to rest, the program subtracts the pulse count stored in the position register from the count stored in the full travel register, and stores the difference between these two counts in the position register at step 182. The program them moves to step 110 in FIG. 4 to begin gate opening. The operations performed at the steps 180 and 182 result in the storing of a number in the position register which represents the motion of the gate 10 between the point at which it was stopped and the fully closed position.

When the gate direction is reversed and the gate begins opening at step 110, the position register will be incremented the exact number of pulses required to return the gate 10 from the stopped position to the full open position as detected at step 118. By way of example, assume that the full travel motion of the gate 10 is represented by one hundred pulses so that the number one hundred is stored in the full travel register. Also assume that the gate 10 has moved from the full open position to a position represented by a count of twenty pulses when either a key switch or a safety switch was actuated or detected at steps 156 or 158 of FIG. 5. Accordingly, the count stored in the position register is twenty. At step 180, the count of twenty is subtracted from the count of one hundred and the difference of eighty is stored in the position register at step 182. When the gate is commanded to open at step 110 in FIG. 4, pulses from the sensor 38 will be detected and stored at steps 112 and 116 until the position register is equal to the full travel register detected at step 118. Since the position register already has the count of eighty, the gate 10 will necessarily only move a distance corresponding to the pulse count of twenty before it is stopped at step 120. The pulse count of twenty exactly corresponds to the distance necessary to bring the gate from its stopped position back to the full open position. Accordingly, the program steps thus described permit the processor 56 to determine the position of the gate 10 even after it has been stopped during its closing motion.

If the gate 10 encounters an obstruction during its closing motion, the following sequence of steps is followed. When the motion of gate 10 is interrupted by the obstruction, this event is detected at step 148 in FIG. 5 when no pulses are produced by the sensor 38 and the interval between pulses has elapsed as detected at step 150. The program moves to step 162 where the gate closing motion is stopped by deenergizing the motor 48. The program pauses one second at step 164, resets the position register to zero at 166, and moves to step 110 in FIG. 4 to begin opening the gate. By resetting the position register to zero at step 166 the program reinitializes the position count to permit resynchronization with the fully open position of the gate 10 as described above.

The program thus described may also be employed when two gates are to be controlled by the system of the present invention. The only differences are that at steps 116 and 162 of the program position registers are provided for counting and storing pulses received from the position sensors associated with each gate. At step 168 in FIG. 5, the program stores the larger of the counts in the position registers in the full travel register. This completes the description of the program for the preferred embodiment of the control system of the present invention.

As will be understood by those skilled in the art, the system described above for the automatic control of electrically operated gates may be utilized to control a wide variety of gates other than the swinging gate shown in FIG. 1. Thus, sliding gates may also be controlled where the disk 34 used to detect angular motion may be replaced with a rail having apertures and which is used to detect linear motion of a sliding gate. In like manner, the system of the present invention may be used to control essentially any movable framework or structure which controls the entrance or exit through an access opening to provide a passageway.

Further, the means for sensing the movement of the gate may be implemented in a variety of ways other than by the use of an apertured disk and photo-interruptor. For example, a disk containing a plurality of magnets, and a magnetic-field sensor such as a Hall-effect transducer may also be employed to sense gate movement.

It will also be understood by those skilled in the art that many different programs may be utilized to implement the flow charts disclosed in FIGS. 4 and 5. Obviously, these programs will vary from one another in some degree. However, it is well within the skill of the art of the computer programmer to provide particular programs for implementing each of the steps of the flow chart disclosed herein. It is also to be understood that various microcomputer circuits other than that selected for the preferred embodiment might be used without departing from the teaching of the invention. It is therefore to be understood that because various other embodiments may be devised by those skilled in the art without departing from the spirit and scope of the invention, it is intended that the invention be limited only by the appended claims.

What is claimed is:

1. A system for the automatic control of an electrically operated gate, comprising:

drive means operatively coupled to the gate for moving it between the open and closed positions;

means for determining the amount of movement of the gate as it moves between the open and closed positions;

storage means for storing the initial amount of movement of the gate as it moves between the full open and the full closed positions;

comparison means for comparing the subsequent amount of movement of the gate to the stored initial amount of movement; and control means for controlling the drive means in response to the comparison means.

2. The system of claim 1 in which the control means stops the movement of the gate when the comparison means indicates that the amount of movement of the gate is equal to the stored initial amount of movement.

3. A system for the automatic control of an electrically operated gate, comprising:

position transducer means operatively connected to the gate and providing a motion signal in the form of pulses, where each pulse represents the motion of the gate over an incremental distance;

counting means responsive to the motion signal for providing a count signal representing the number of pulses produced by the position transducer in response to the motion of the gate;

first detection means responsive to the motion signal for providing an obstruction signal whenever pulses are not being produced by the position transducer;

second detection means responsive to an external command signal for providing a gate closing signal, a gate opening signal, and a gate stop signal;

first storage means responsive to the count signal for providing a position signal representing the number of pulses produced by the position transducer in response to the motion of the gate as measured from the position at which the gate motion was last stopped;

first synchronizing means responsive to the first and second detection means for synchronizing the first storage means to the end of travel positions of the gate;

second storage means responsive to the first storage means for providing a full travel signal representing the number of pulses produced by the position transducer in response to the gate traveling between the full open position and the full closed position;

second synchronizing means responsive to the first and second detection means for synchronizing the second storage means to the full travel motion of the gate;

comparator means for comparing the position signal to the full travel signal to provide an end of travel signal;

first control means responsive to the gate closing signal and the gate opening signal for moving the gate open and closed, respectively; and second control means responsive to either the gate stop signal, the obstruction signal or the end of travel signal for stopping the motion of the gate.

4. The system of claim 3 in which the first synchronizing means includes means for resetting the position signal to zero in response to the occurrence of either the gate closing signal or the gate opening signal.

5. The system of claim 3 in which the second synchronizing means includes:

means responsive to the first occurrence of the gate closing signal after operating power is furnished to the system for providing an initialize signal; and transfer means responsive to the first occurrence of the obstruction signal after the occurrence of the initialize signal for transferring the position signal from the first storage means to the second storage means so that the full travel signal equals the position signal.

6. The system of claim 4 in which the first synchronizing means further includes means for resetting the position signal to zero in response to the obstruction signal if the gate is closing for other than the first time after operating power is furnished to the system.

7. The system of claim 3 in which the second detection means further provides the gate opening signal in response to the first occurrence of the external command signal after operating power is furnished to the system, and thereafter alternatively provides gate closing and opening signals in response to successive occurrences of the external command signal, if the command signal occurs after the gate motion is stopped.

8. The system of claim 7 in which the second detection means further provides the gate stop signal during the time in which the gate is closing in response to the occurrence of either the external command signal or an external safety signal.

9. The system of claim 8 in which the first synchronizing means further includes means responsive to the occurrence of the gate stop signal for determining the difference between the full travel signal and the position signal and for setting the position signal equal to the difference.

10. The system of claim 8 in which the second detection means further includes means for automatically providing the gate closing signal whenever the second control means has stopped the opening motion of the gate.

11. The system of claim 3 which further includes an electrically operated lock, and means for locking the lock when the gate is in the fully closed position.

12. The system of claim 3 in which the comparator means provides the end of travel signal when the position signal equals the full travel signal.

13. The system of claim 3 in which the second detection means further provides the gate open signal if, while the gate is closing, the gate motion is stopped by the second control means in response to either the gate stop signal or the obstruction signal.

14. A system for the simultaneous automatic control of two electrically operated gates, comprising:

first and second position transducer means operatively connected to each gate and providing first and second motion signals in the form of pulses, where the pulses represent the respective motion of the gates over an incremental distance;

first and second counting means responsive to the first and second motion signals, respectively, for providing first and second count signals, each representing the number of pulses produced by the position transducers in response to the motion of the respective gate;

first detection means responsive to the first and second motion signals for providing an obstruction signal whenever pulses are not being produced by either of the position transducers;

second detection means responsive to an external command signal for providing a gate closing signal, a gate opening signal, and a gate stop signal;

first storage means responsive to the larger of the first or second count signals for providing a position signal representing the largest number of pulses produced by either of the position transducers in response to the motion of the gates as measured from the position at which the motion of either gate was last stopped;

first synchronizing means responsive to the first and second detection means for synchronizing the first storage means to the end of travel positions of the gate;

second storage means responsive to the first storage means for providing a full travel signal representing the largest number of pulses produced by either of the position transducers in response to the gates traveling between the full open position and the full closed position;

second synchronizing means responsive to the first and second detection means for synchronizing the second storage means to the full travel motion of the gates;

comparator means for comparing the position signal to the full travel signal to provide an end of travel signal;

first control means responsive to the gate closing signal and the gate opening signal for moving the gates open and closed, respectively; and second control means responsive to either the gate stop signal, the obstruction signal, or the end of travel signal for stopping the motion of the gates.

15. A method for the automatic control of an electrically operated gate, comprising the steps of:

moving the gate between the open and closed positions;

determining the amount of movement of the gate as it moves between the open and closed positions;

storing the initial amount of movement of the gate as it moves between the full open and the full closed positions;

comparing the subsequent amount of movement of the gate to the stored initial amount of movement; and controlling the movement of the gate in response to the comparison.

16. The method of claim 15 in which the step of controlling the movement of the gate further includes the step of stopping the movement of the gate when the subsequent amount of movement of the gate is equal to the stored initial amount of movement.

17. A method for the automatic control of an electrically operated gate, comprising the steps of:
encoding the incremental motion of the gate to provide a motion signal in the form of pulses, where each pulse represents the motion of the gate over an incremental distance:
counting the number of pulses of the motion signal to provide a count signal;
detecting the occurrence of an external command signal and providing a gate closing signal, a gate opening signal and a gate stop signal in response thereto;
storing the count signal to provide a position signal representing the number of pulses produced by the position transducer in response to the motion of the gate as measured from the position at which the gate motion was last stopped;
synchronizing the position signal to the end of travel position of the gate;
storing the position signal to provide a full travel signal representing the number of pulses produced by the position transducer in response to the gate traveling between the full open position and the full closed position;
synchronizing the full travel signal to the full travel motion of the gate;
comparing the position signal to the full travel signal to provide an end of travel signal;
moving the gate closed and open, respectively, in response to the gate closing signal and the gate opening signal; and
stopping the gate in response to either the gate stop signal, the obstruction signal, or the end of travel signal.

18. The method of claim 17 in which the steps of detecting the occurrence of an external command signal further includes the steps of:
providing the gate opening signal in response to the first occurrence of the external command signal after operating power is furnished to the system; and
providing gate closing and opening signals alternately in response to successive occurrences of the external command signals if the command signals occur after the gate motion is stopped.

19. The method of claim 18 in which the step of detecting the occurrence of an external command signal further includes the step of providing the gate stop signal during the time in which the gate is closing, in response to the occurrence of either the external command signal or an external safety signal.

20. The method of claim 19 in which the step of synchronizing the position signal to the end of travel positions of the gate further includes the steps of:
determining the difference between the full travel signal and the position signal to provide a difference signal; and
setting the position signal equal to the difference signal in response to the occurrence of the gate stop signal.

21. The method of claim 17, in which the step of comparing the position signal to the full travel signal further includes the step of providing the end of travel signal when the position signal equals the full travel signal.

22. The method of claim 17 in which the step of detecting the occurrence of an external command signal further includes the step of providing the gate open signal if while the gate is closing the gate motion is stopped in response to either the gate stop signal or the obstruction signal.

23. A method for the simultaneous automatic control of two electrically operated gates, comprising the steps of:
encoding the incremental motion of each gate to provide first and second motion signals in the form of pulses, where each pulse represents the motion of the respective gate over an incremental distance;
counting the number of pulses of the first and second motion signals to provide first and second count signals, respectively;
detecting the non-occurrence of pulses of either of the motion signals to provide an obstruction signal;
detecting the occurrence of an external command signal and providing a gate closing signal, a gate opening signal and a gate stop signal in response thereto:
storing the larger of the first or second count signals to provide a position signal representing the largest number of pulses produced by either of the position transducers in response to the motion of the gates as measured from the position at which the motion of either gate was last stopped;
synchronizing the position signal to the end of travel positions of the gates;
storing the position signal to provide a full travel signal representing the largest number of pulses produced by either of the position transducers in response to the gates traveling between the full open position and the full closed position;
synchronizing the full travel signal to the full travel motion of the gates;
comparing the position signal to the full travel signal to provide an end of travel signal;
moving the gates closed and open, respectively, in response to the gate closing and or the gate opening signal; and
stopping the gates in response to either the gate stop signal, the obstruction signal, or the end of travel signal.

24. A system for moving a closure member from a fully opened position to a fully closed position and back to a fully opened position with respect to an access opening, said system comprising:
(a) drive means operatively coupled to the closure member for driving it between the opened and closed positions,
(b) counting means for generating a count representing the amount of movement of the closure member from the fully opened position to the fully closed position or from the fully closed position to the fully opened position and for converting the count to a distance signal,
(c) memory means for storing said distance signal representative of the amount of movement of the closure member from the fully closed position to the fully opened position or from the fully opened position to the fully closed position after initialization of said memory means,
(d) processing means operatively connected to said memory means for causing said memory means to store the distance signal for the first time after initialization thereof that the distance signal is generated as a result of uninterrupted movement of the closure member from the fully opened position to the fully closed position or from the fully closed position to the fully opened position, (e) coupling means operatively connecting the processing means to the drive means for causing said closure member to move between the fully opened and closed positions on all subsequent occasions in accordance with the distance represented by said distance signal until re-initialization of said memory means, thereby enabling the closure member to effectively program the amount of movement between the opened and closed positions so that the processing means controls the drive means in all subsequent opening and closing movements to move the closure member from the fully opened position to the fully closed position and automatically stop the movement at the fully closed position and to move the closure member from the fully closed position to the fully opened position and automatically stop the movement at the fully opened position.

25. The system of claim 24 further characterized in that said closure member is a gate capable of being moved between the opened and closed positions with respect to a gate access opening and to provide access when in the opened position.

26. The system of claim 24 further characterized in that said counting means comprises:

(a) a source of light, (b) a light sensitive transducer capable of generating an electrical pulse in response to incidence of light thereon, and (c) an interruptor member capable of being rotated by a drive means which moves said moveable member and which is located between said source of light and said transducer to periodically interrupt the light incident on the transducer and thereby generate an electrical pulse representative of a count for each interruption.

27. The system of claim 24 further characterized in that said counting means comprises:

(a) a magnetic member, (b) a metallic member capable of magnetically coacting with said magnetic member to generate a count when one is moved relative to the other.

28. The system of claim 24 further characterized in that said processing means controls said drive means in said manner that said drive means will reverse the direction of movement of said closure member if no counts are detected for a predetermined time interval during movement of the closure member between the opened and closed positions, without changing the distance signal and will move the closure member on subsequent occasions through a distance represented by the distance signal.

29. The system of claim 28 further characterized in that the failure to detect counts during movement of the closure member between the opened and closed positions is representative of contact with a fixed object obstructing movement of the closure member.

30. An apparatus for shifting a moveable member through a controlled distance from a closed position with respect to an access opening to an opened position and from the opened position to the closed position, said apparatus comprising:

(a) housing means, (b) motive means associated with said housing means, (c) drive means operable by said motive means and being coupled to said moveable member for moving same between the opened and closed positions, (d) a source of light, (e) a light sensitive transducer capable of generating an electrical pulse in response to incidence of light thereon, (f) a counting element moveable by said drive means and which counting element moves in response to operation of the drive means between the source of light and with the movement of said moveable member from the opened to the closed position or from a closed to the opened position, said counting element periodically interrupting the light incident on the transducer and thereby enabling generation of an electrical pulse for each interruption, said counting element thereby generating counts representing amount of movement as it moves, and (g) processing control means operatively associated with said counting element for initially determining the number of counts and hence amount of movement of said counting element and thereby determining the amount of movement of said moveable member between the closed position and the opened position, said processing control means being coupled to said motive means such that the motive means is operable to shift the moveable member from the opened position to the closed position or from the closed position to the opened position for the desired number of counts on subsequent occasions in accordance with the initially determined counts and initially determined amount of movement.

31. The apparatus of claim 30 further characterized in that said control means comprises an electronic control means including a solid state circuit board.

32. The apparatus of claim 30 further characterized in that said counting element comprises a disc having a plurality of apertures therein and said source of light and transducer are located with respect to said apertures to generate signals when the apertures become aligned with the source of light.

33. A method for the automatic control of an electrically operated gate, comprising the steps of:

encoding the incremental motion of the gate to provide a motion signal in the form of pulses, where each pulse represents the motion of the gate over an incremental distance;

counting the number of pulses of the motion signal to provide a count signal;

detecting the occurrence of an external command signal and providing a gate closing signal, a gate opening signal and a gate stop signal or a gate obstruction stop signal in response thereto;

storing the count signal to provide a position signal representing the number of pulses produced by a position signal representing the number of pulses produced by a position transducer in response to the motion of the gate as measured from the position at which the gate motion was last stopped;

synchronizing the position signal to an end of travel position of the gate; said step of synchronizing the position signal to the end of travel position further comprising the steps of resetting the position signal to zero in response to the occurrence of either the gate closing signal or the gate opening signal, and resetting the position signal to zero in response to the obstruction signal if the gate is closing for other than the first time after operating power is furnished to the system;

storing the position signal to provide a full travel signal representing the number of pulses produced by the position transducer in response to the gate traveling between the full open position and the full closed position;

synchronizing the full travel signal to the full travel motion of the gate;

comparing the position signal to the full travel signal to provide an end of travel signal;

moving the gate closed and open, respectively, in response to the gate closing signal and the gate opening signal; and stopping the gate in response to either the gate stop signal, the obstruction stop signal, or the end of travel signal.

34. A method for the automatic control of an electrically operated gate, comprising the steps of:

encoding the incremental motion of the gate to provide a motion signal in the form of pulses, where each pulse represents the motion of the gate over an incremental distance;

counting the number of pulses of the motion signal to provide a count signal;

detecting the occurrence of an external command signal and providing a gate closing signal, a gate opening signal or a gate obstruction stop signal in response thereto;

storing the position signal to provide a full travel signal representing the number of pulses produced by the position transducer in response to the gate traveling between the full open position and the full closed position;

synchronizing the position signal to an end of travel position of the gate;

storing the position signal to provide a full travel signal representing the number of pulses produced by the position transducer in response to the gate traveling between the full open position and the full closed position;

synchronizing the full travel signal to the full travel motion of the gate; said step of synchronizing the full travel signal to the full travel motion comprising:

detecting the first occurrence of the gate closing signal after operating power is furnished to the system and providing an initialize signal in response thereto, and equating the value of the full travel signal to the value of the position signal in response to the first occurrence of the obstruction signal after the occurrence of the initialize signal;

comparing the position signal to the full travel signal to provide and end of travel signal;

moving the gate closed and open, respectively, in response to the gate closing signal and the gate opening signal; and stopping the gate in response to either the gate stop signal, the obstruction stop signal, or the end of travel signal.

35. A method for the automatic control of an electrically operated gate, comprising the steps of:

encoding the incremental motion of the gate to provide a motion signal in the form of pulses, where each pulse represents the motion of the gate over an incremental distance;

counting the number of pulses of the motion signal to provide a count signal;

detecting the occurrence of an external command signal and providing a gate closing signal, a gate opening signal and a gate stop signal in response thereto;

said step of detecting the occurrence of an external command signal further includes the steps of:

providing the gate opening signal in response to the first occurrence of the external command signal after operating power is furnished to the system;

providing gate closing and opening signals alternately in response to successive occurrences of the external command signals if the command signals occur after the gate motion is stopped, said gate closing signal being provided whenever the opening motion of the gate is stopped, providing said gate stop signal during the time in which the gate is closing, in response to the occurrence of either the external command signal or an external safety signal;

storing the count signal to provide a position signal representing the number of pulses produced by the position transducer in response to the motion of the gate as measured from the position at which the gate motion was last stopped;

synchronizing the position signal to the end of travel position of the gate;

storing the position signal to provide a full travel signal representing the number of pulses produced by the position transducer in response to the gate traveling between the full open position and the full closed position;

synchronizing the full travel signal to the full travel motion of the gate;

comparing the position signal to the full travel signal to provide an end of travel signal;

moving the gate closed and open, respectively, in response to the gate closing signal and the gate opening signal; and stopping the gate in response to either the gate stop signal, the obstruction signal, or the end of travel signal.

36. A system for moving a closure member from a fully opened position to a fully closed position and back to a fully opened position with respect to an access opening, said system comprising:

(a) drive means operatively coupled to the closure member for driving it between the opened and closed positions, (b) counting means for generating a count representing the amount of movement of the closure member from the fully opened position to the fully closed position or from the fully closed position to the fully opened position and for converting the count to a distance signal, (c) memory means for storing said distance signal representative of the amount of movement of the closure member from the fully closed position to the fully opened position or from the fully opened position to the fully closed position after initialization of said memory means, (d) processing means operatively connected to said memory means for causing said memory means to store the distance signal for the first time after initialization thereof that the distance signal is generated as a result of uninterrupted movement of the closure member from the fully opened position to the fully closed position or from the fully closed position to the fully opened position, and (e) coupling means operatively connecting the processing means to the drive means for causing said closure member to move between the fully opened and closed positions on all subsequent occasions in accordance with the distance represented by said distance signal until re-initialization of said memory means, thereby enabling the closure member to effectively program the amount of movement between the opened and closed positions so that the processing means controls the drive means in all subsequent opening and closing movements to move the closure member from the fully opened position to the fully closed position and automatically stop the movement at the fully closed position and to move the closure member from the fully closed position to the fully opened position and automatically stop the movement at the fully opened position, said processing means controlling said drive means in said manner that said drive means will reverse the direction of movement of said closure member if said closure member contacts a fixed object obstructing movement of the closure member during movement between the opened and closed positions, such that if no counts are detected for a predetermined time interval during movement of the closure member between the opened and closed positions, without changing the distance signal and will move the closure member on subsequent occasions through a distance represented by the distance signal, said processing means initially causing said drive means to attempt to move the closure member in the same direction of movement after contacting said fixed object before reversing direction of movement thereof.

37. The system of claim 36 further characterized in that said processing means de-energizes said drive means after the closure member binds on a fixed object and said drive means attempts to move the closure member in each direction a pre-determined number of times and the closure member cannot be moved to the fully opened position or the fully closed position.

38. A system for the automatic control of an electrically operated gate, comprising:

drive means operatively coupled to the gate for moving it between the open and closed position;

means for generating a count responsive to the amount of movement of the gate as it moves between the open and closed positions;

first storage means responsive to the count for providing a position signal representing the distance of movement of the gate as measured from the position at which the gate motion was last stopped;

first synchronizing means responsive to the first position signal for synchronizing the first storage means to the end of a travel position of the gate;

second storage means responsive to the first storage means for providing a full travel signal representing a count in response to the gate traveling between the full open position and the full closed position;

second synchronizing means for synchronizing the second storage means to the full travel motion of the gate;

comparison means for comparing the position signal to the full travel signal to provide output signal representative of the amount of movement of the gate; and control means for controlling the drive means in response to the output signal from the comparison means.

39. The system of claim 38 in which the control means stops the movement of the gate when the comparison means indicates that the amount of movement of the gate is equal to the stored initial count representative of the amount of movement.

* * * * *